April 14, 1959   J. L. LEONARD   2,881,832
TIME AND CONDITION PROGRAM UNIT
Filed Feb. 18, 1955   3 Sheets-Sheet 1

INVENTOR.
JOHN L. LEONARD
ATTORNEYS

INVENTOR.
JOHN L. LEONARD
BY George Sipkin
George E. Pearson
ATTORNEYS

April 14, 1959  J. L. LEONARD  2,881,832
TIME AND CONDITION PROGRAM UNIT
Filed Feb. 18, 1955  3 Sheets-Sheet 3

INVENTOR.
JOHN L. LEONARD
BY
ATTORNEYS

United States Patent Office 2,881,832
Patented Apr. 14, 1959

2,881,832

TIME AND CONDITION PROGRAM UNIT

John L. Leonard, San Diego, Calif.

Application February 18, 1955, Serial No. 489,312

8 Claims. (Cl. 161—1)

(Granted under Title 35, U. S. Code (1952), sec. 266)

The invention described herein may be manufactured and used by or for the Government of the United States of America for governmental purposes without the payment of any royalties thereon or therefor.

This invention relates to a universal time and condition program unit and more particularly to apparatus and circuitry for energizing an infinite number of operational circuits in predetermined timed sequences, each circuit being energized over a predetermined time interval independent of the timing sequence of any of the other circuits. These timing sequences may be made to recycle and to continuously repeat or made to vary in an infinite number of predetermined patterns of timing sequences, as desired.

This invention consists of the combination of two basic functional parts, the "timer" and the "condition selector." In the present embodiment, the "timer" is a device that may be termed a "ring switch" and consists of any desired number of separate timing units each one controlling the onset of the next in a chain action, the final one being connected back to control the first thus completing the ring. Each unit in this embodiment consists of a simple conventional flip-flop timing circuit. A means of starting and stopping the whole process is also supplied, and this same arrangement makes possible the operation in a repetitive manner as given above or as a one-shot device. A further innovation rendering the timer extremely versatile is the simultaneous starting of several timers of different duration at each stage of the ring. Each timer in each stage can be made to open and/or close electrical circuits of practically any nature. In the present embodiment this is done by relay operation.

Previous timing sequence devices have been developed comprising the use of rotatable and adjustable cams operated by an electrically driven shaft. As the shaft rotates, certain of the cams close certain switches, energizing desired circuits. Examples of these devices are found in the regulation of stop lights, cook stoves and other types of multi-circuit operations.

These devices, however, are limited in the number of operations and also in that the cams continuously repeat the same series of timing sequences or are designed to stop at the end of each timing cycle unless reset by some external source. These devices cannot be calibrated for fine adjustment such that extreme accuracy in timing, such as in milliseconds, cannot be obtained, and the presetting of the cams is laborious and difficult.

The apparatus and circuitry of the present invention comprises a series of flip-flop circuits each progressively excited by the previous one, the last one exciting the first to recycle the same timing sequence, the last one ending the sequence or actuating a conditioner program unit which starts a completely new set of timing sequences. The conditioner programmer comprises a cylindrical drum having a number of rows of apertures spaced about its surface for the insertion of plugs similar to a small jack which actuate switches closing circuits in a desired sequence. Any of these circuits may be fed back into the timing units to vary the timing cycle or to vary the speed of stepping of the drum. The original model built to test the principles of this invention had a drum with 12 rows of 180 apertures each, although more rows with more apertures per row could be used as desired.

An object of the present invention is to provide a novel and improved universal time and condition program unit.

Another object is to provide an instrument having a number of circuits some of which are energized in sequence timing with respect to other of the circuits.

Another object is to provide a time and conditioner unit for sequentially energizing a number of circuits at preselected time intervals and to energize each circuit for a preselected duration independent of the sequential timing and energizing period of other circuits.

Another object is the provision of a series of flip-flop circuits progressively excited by each preceding circuit, the last circuit selectively ending the timing cycle, exciting the first circuit to repeat the sequence or repeating a modified timing sequence, selected by the condition drum, as desired.

Another object is the provision of a series of timing units for sequentially energizing a multiple of circuits and a condition programing unit for selectively changing the timing sequence and timing interval between the energization of the various circuits.

A further object is the provision of a time and condition program unit for energizing any desired number of circuits in any desired time sequence for any desired time interval.

Other objects and many of the attendant advantages of this invention will readily be appreciated as the same becomes better understood by reference to the following detailed description when considered in connection with the accompanying drawings wherein.

Figure 1:
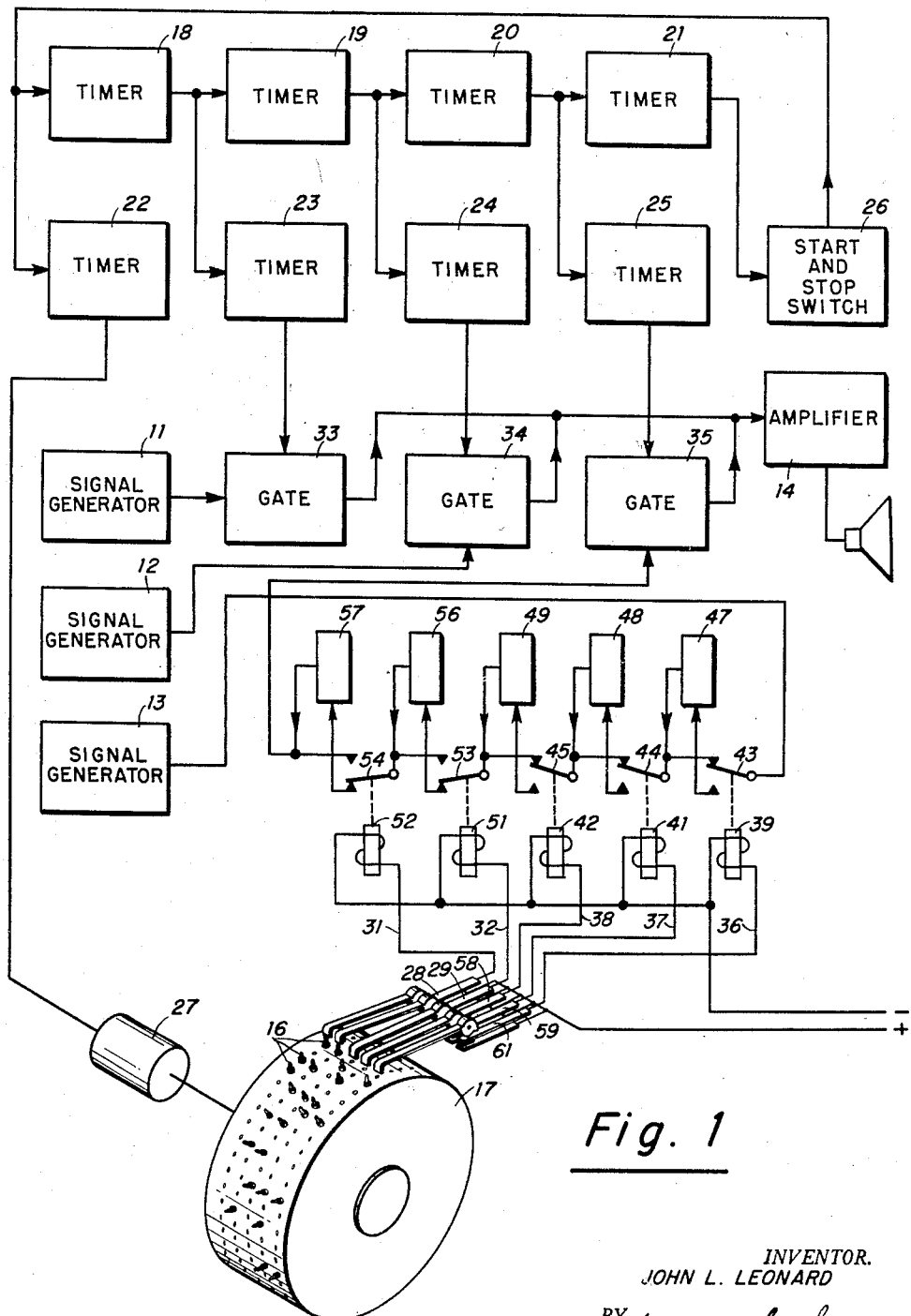
Fig. 1 shows a block diagram of the device set up to solve a typical problem.

Referring now to Fig. 1, there is shown signal generators 11, 12, and 13 for simulating "white noise," "tone 1" and "tone 2" noises respectively. It is desired to connect these generators to the input of amplifier 14 in a certain sequence at certain time intervals and for certain time durations, all predetermined. It is further desirable to vary the intensity of "tone 2" so that the subject might make comparison of "tone 2" and "tone 1" in the background of noise from generator 11. This is accomplished in the following manner: The signal generator 11 sends white noise through gate 33 to the amplifier 14 for a period of four seconds. After the second generator 12 transmits "tone 1" for a period of one second and then there is a one second interval, after which generator 13 transmits "tone 2" through gate 34 by way of the attenuators hereinafter to be describde for one second. Then it is desired to have a one second resting period during which no noise whatsoever is heard and then the recycling occurs and the presentation starts over again. In this problem the only difference between one sequence or presentation and the other one is that the intensity of "tone 2" during the period between the third and fourth seconds is to be varied from presentation to presentation. This is accomplished by the rotating of drum 17 to another row of plugs 16 which in turn will actuate a different group of switches from switches 28, 29, 58, 59, and 61, which control the various relays which will switch into the circuit the various attenuators 47, 48, 49, 56, and 57, which in turn affect the level of intensity of "tone 2." The switching and timing of this sequence is controlled by timing ring comprising timers 18, 19, 20, and 21, associated with the drum advance timer 22 and the three gate or operational timers 23, 24, and 25.

To accomplish the foregoing timing sequence, the first trigger and delay timer 18 is set to delay the pulse one second, timer 19 one second, timer 20 two seconds, and timer 21 one second. It will be noted that this totals up to five seconds which accounts for four seconds of the signal noise from generator 11 and the one second delay between presentations. Noting the parallel input of the timing and operational timers, timer 22 advances the drum 17 by putting out a D.C. signal of one-half second duration to advance the step motor 27 to the next position of drum 17. Timer 23 which controls gate 33 opens it for a period of four seconds permitting the signal noise from generator 11 to be heard through amplifier 14. At the end of one second operating time, the timer 24 opens gate 34 for a period of one second permitting the "tone 1" signal from generator 12 to be heard through the amplifier 14. "Tone 1" can be heard above the noise also being amplified. Similarly, after a two second delay timer 25 is open for one second permitting the "tone 2" noise of generator 13 to be heard on amplifier 14. As previously pointed out the tone from generator 13 passes through certain preselected attenuators to reach the desired tone intensity. In the application as shown in Fig. 1, circuits 31 and 32 have been energized because plugs 16 in the row shown actuates switches 28 and 29 closing those circuits. Relays 51 and 52 in circuits 31 and 32 actuate the switches 53 and 54 which connect into the "tone 2" circuit the attenuators 56 and 57. Thus the signals of "tone 2" are connected through attenuators 56 and 57 to gate 35 which, when opened, permits "tone 2" to pass out through amplifier 14. These attenuators have been set at preselected desired levels. At the end of five seconds the timing cycle is ready for a repeated presentation and timer 22 advances the drum 17 to the next position where certain of the plugs 16 will actuate new attenuator settings. In this problem, an observer listens to the "tone 2" noises and compares them with "tone 1" and the number of sequences or presentations is determined by the number of rows of plugs 16 set into the drum 17. At the end of the last presentation a plug on the drum closes a circuit actuating relay 77 (Fig. 5) which will automatically terminate the operation when that timing sequence is ended. While this is not shown in Fig. 1, the turning off of the start-stop switch at the end of the operation is shown and discussed in connection with Fig. 2 and Fig. 5. It should be understood, of course, that circuits energized by operational timers 22, 23, 24, and 25 as well as circuits including the attenuators 47, 48, 49, 56, and 57 may remain energized and continue to operate, if desired, after the timing cycle as determined by timers 18, 19, 20, and 21 has been completed. This may be done simply by increasing the delay time of timers 22, 23, 24, or 25.

Figure 3:
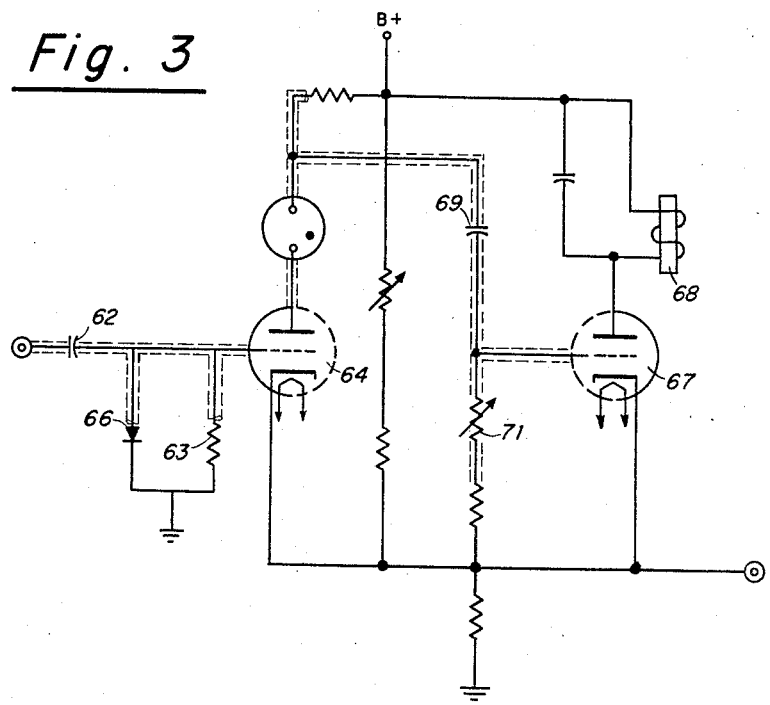
Fig. 3 shows a schematic diagram of one of the ring switch timing units.
Figure 4:
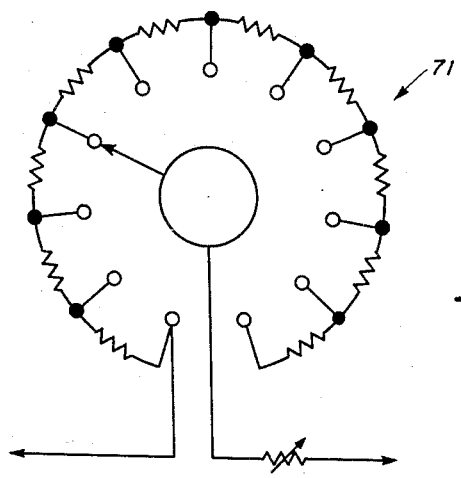
Fig. 4 shows a more detailed view of the variable resistor used in the ring switch timing unit of Fig. 3.

The "timing ring" comprises timers 18, 19, 20, and 21, and the start-stop switch 26, all connected in series, the last being connected to the first to form a "ring" or completed loop. The timers are identical, one of which is shown in Fig. 3. Here the negative square pulse received from the preceding unit is differentiated by the condenser 62 and resistor 63 in the grid input of tube 64. This gives rise to a sharp negative pulse followed by a sharp positive pulse, these corresponding in time respectively to the leading and trailing edges of the incoming pulse. The crystal diode 66 is inserted to minimize the negative pulse of this pair, which is necessary only for reliability in high speed operations. The positive peak starts conduction in the tube 64 after which the circuit behaves in the conventional flip-flop manner, the period of conduction in this tube being dependent not upon the initiating pulse but upon the cut-off period of the second tube 67 which in turn is dependent upon the RC constant in its grid circuit. The operational time of relay 68 is dependent upon the state of conduction of tube 67 in whose plate circuit it is placed. This relay closes and/or opens any desired circuit. The RC constant is determined by the size of condenser 69 and variable resistor 71, shown in greater detail in Fig. 4. This resistor may be manually set on the instrument panel by the operator or may be used in a manner similar to the attenuators in Fig. 1 and controlled by the condition drum 17.

Figure 5:
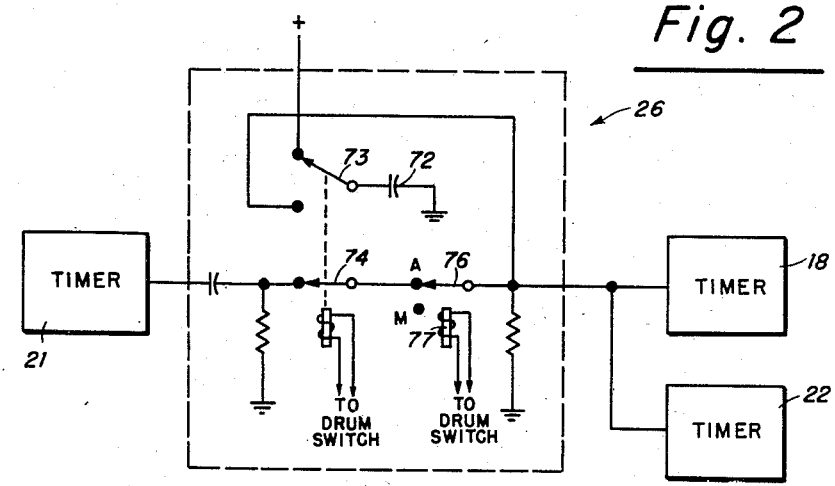
Fig. 5 shows a diagram of the start-stop ring switch.

Fig. 5 shows a simple form of the start-stop switch 26. Condenser 72 is charged from a positive potential through spring-loaded switch 73. When switched to "Start" position by the operator, it connects the condenser to the grid circuit in timers 18 and 22, furnishing the initial positive pulse to start the operation of the timing ring. At the moment timers 18 and 22 are pulsed, the connection to timer 21 must be broken to prevent the pulsing of timer 21 also. To accomplish this, switch 74 is ganged to switch 73 in a break-before-make switching arrangement. In the pulsing of timers 18 and 22, the time of contact of switch 73 is not critical since, at most, condenser 72 will discharge, the positive potential not being in the circuit. As shown in Fig. 5, switch 76 is set for "Automatic" so that the triggering pulse from timer 21 recycles the timing unit and the same sequence will be repeated. The switch 76 can be set for "Manual" in which case switch 73 must again be pressed by the operator to start the next cycle. It becomes readily apparent that switch 74 might be actuated by a relay such as in the attenuator circuits in Fig. 1 so that external circuits could switch it from "Auto" to "Manual," as desired, to stop the entire operation. For example, a plug 16 could be inserted into drum 17 in a position so that upon a complete revolution of the drum it would close a suitable switch which would energize a relay which would disengage switch 76 from "Auto" position.

Figure 2:
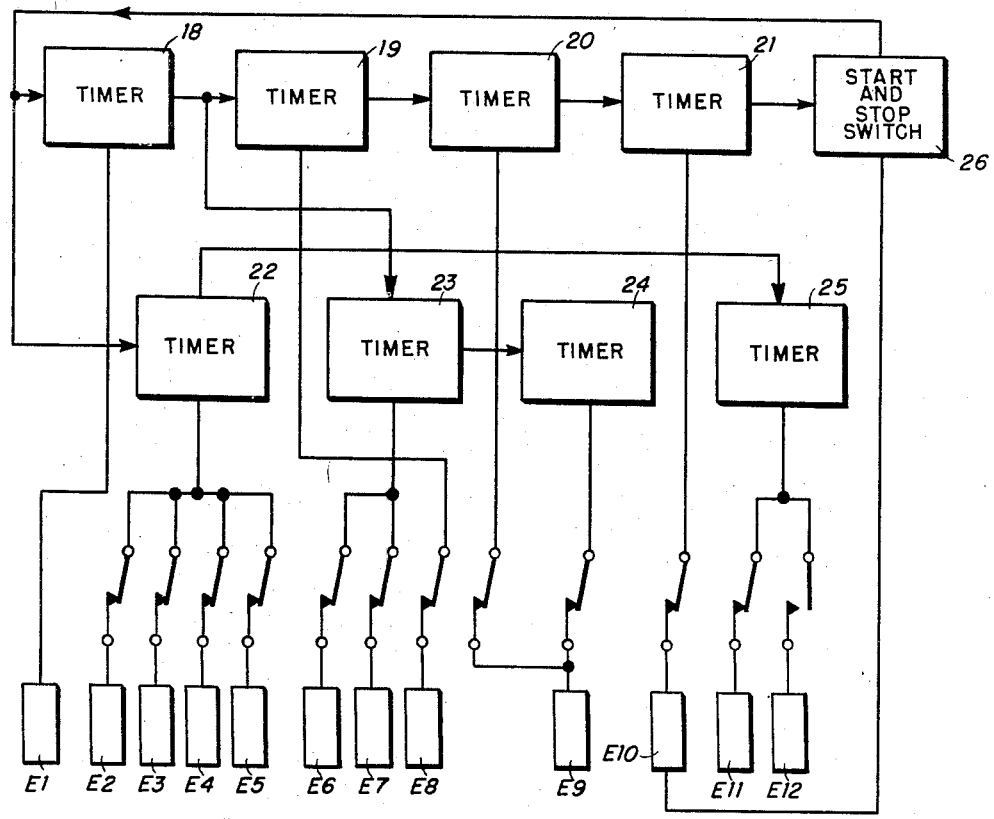
Fig. 2 shows another block diagram showing another example of the versatility in the application of the present invention.

The use of this time and condition program unit is universal and can be used wherever time and condition programming is needed, whether in manufacturing, assembly line operations or in complicated electronic circuitry for experimental, development or testing uses. Fig. 2 shows another arrangement which points out the versatility of this unit. The timing ring comprises start-stop switch 26 and trigger timers 18, 19, 20, and 21, arranged in series. These also act as operational timers as will hereinafter be explained. To these timers are connected circuit operational timers 22, 23, 24, and 25 in any predetermined manner, for example as shown. Here timers 22 and 23 also act as delay timers for timers 25 and 24 respectively. Let the triggering time of units 18, 19, 20, and 21 be 8 seconds, 9 seconds, 1 second and 1 second respectively and the operating time of units 22, 23, 24, and 25, be 2, 3, 4, and 5 seconds respectively. $E_1$ to $E_{12}$ represent various equipment or operating circuits. The switches shown diagrammatically are representations of the drum switches of Fig. 1. The timing of the timing ring cycle is $8+9+1+1=19$ seconds. $E_1$ is energized in 8 seconds, $E_2$, $E_3$, $E_4$, and $E_5$ are energized immediately and operate for 2 seconds, $E_6$ and $E_7$ are energized in 8 seconds and operate for 3 seconds, $E_8$ starts operating in 8 seconds and continues for 9 seconds, $E_9$ starts in 11 seconds and continues for 4 seconds, then starts after 17 seconds and runs 1 second, $E_{10}$ starts in 18 seconds and runs 1 second, $E_{11}$ in 2 seconds and operates for 5 seconds, while $E_{12}$ is not energized at all, since its drum switch was not closed by a pin 16. $E_{10}$, for example, might be the circuit which actuates step motor 27 in Fig. 1, to move the next row of pins 16 into position. The next row might be such as to engage or disengage $E_1$ to $E_{12}$ in an entirely different pattern.

From the foregoing description of the operation of the invention in Fig. 1 and Fig. 2, it becomes readily apparent that literally thousands of combinations of timing sequences are possible, simply by regulating the timing of the timers, connecting them in various arrangements, and using the condition drum to connect various sets of circuits in desired sequence. It can be made even more versatile by inserting more plugs 16 in an elongated drum, these in turn varying the resistances 71 in the various timing unit.

Completely different time and condition sequence requirements may be preset at one's leisure on drums not operating in the unit. Thus, when one drum of sequences has been completed, a new drum may be inserted in a matter of seconds and an entirely new set of time and condition sequences may be actuated.

Obviously many modifications and variations of the present invention are possible in the light of the above teachings. It is therefore to be understood that within the scope of the appended claims the invention may be practiced otherwise than as specifically described.

What is claimed is:

1. A universal time and condition programming unit comprising a timing ring including delay timers and a start-stop switch for rendering said timing ring operative and inoperative, operational timing means electrically connected to and controlled by said timing ring in a predetermined time sequence, a plurality of operational circuits electrically connected to and controlled by said operational timing means, one of said operational circuits electrically connected to and controlling said start-stop switch, said operational circuits comprising normally open switches and a step-motor driven variable drum switching means adapted to actuate said normally open switches when said motor is stepped, whereby each of said operational circuits is energized for a predetermined time independent of the sequential timing and energizing period of the other operational circuits.

2. The apparatus of claim 1, said delay timers each having a flip-flop circuit including a first and second tube, means alternately operating said first and second tube, and adjustable means for selectively controlling the time of operation of each of said tubes.

3. A universal time and condition programming unit comprising a timing ring including a start-stop means for rendering said timing ring operative and inoperative and a plurality of progressively pulsed triggering and delay timers, a plurality of operational timers electrically connected to said ring and adapted to be pulsed by said ring in a predetermined time sequence, a plurality of operational circuits electrically connected to said operational timers, one of said operational circuits being electrically connected to and controlling said start-stop switch for stopping operation of said timing ring, normally open switch means in said operational circuits, a step-motor driven condition programming drum electrically connected to and controlled by one of said operational timers and adapted to be stepped in a predetermined time sequence, and plugs selectively inserted on said drum adapted to engage and close said normally open switch means when said motor is stepped whereby each of said operational circuits is energized for a predetermined time independent of the sequential timing and energizing period of the other operational circuits.

4. The apparatus of claim 3, wherein said start-stop means and said triggering and delay timers are connected in series, the last of said triggering and delay timers being connected to the input connection of said start-stop means and the output connection of said start-stop means being connected to the first of said timers whereby a complete electrical circuit is formed.

5. The apparatus of claim 3, said start-stop means comprising a spring-loaded switch having a first position and a condenser connecting a potential source to ground, a second position for said spring-loaded switch, said second position connected to said output connection, a second switch when closed connecting said second position and said output connection with said input connection, said second switch ganged with said spring-loaded switch in break-before-make arrangement, such that when said spring-loaded switch is disengaged from said potential source and engaged with said second position to discharge said condenser through said output connection, said second switch is open, disconnecting said input connection.

6. The apparatus of claim 5 further including a second input connection switch, said last named switch when in position to connect said input connection to said output connection permitting automatic re-cycling of said timing ring and when in position to disconnect said input connection from said output connection renders said timing ring inoperative.

7. The apparatus of claim 5, including a relay connected to said one operational circuit adapted to move said second input connection switch for disconnection of said input connection from said output connection.

8. A universal time and condition programming unit comprising a plurality of timing means including a start-stop means for rendering said timing means operative and inoperative, a plurality of operational timing means electrically connected to said timing means and adapted to be operated by said timing means in a predetermined time sequence, a plurality of operational circuits electrically connected to and controlled by said operational timing means, one of said circuits being connected to said start-stop means for stopping operation of said timing means, normally open switch means in said operational circuits, a step-motor driven drum electrically connected to one of said operational timing means and adapted to be stepped in a predetermined time sequence, and plugs selectively inserted on said drum and adapted to engage and close said normally open switch means when said motor is stepped whereby each of said operational circuits is energized for a predetermined time independent of the sequential timing and energizing period of the other operational circuits.

References Cited in the file of this patent

UNITED STATES PATENTS

| | | |
|---|---|---|
| 1,726,520 | Kramer | Aug. 27, 1929 |
| 2,250,919 | Skelly | July 29, 1941 |
| 2,393,187 | Powell | Jan. 15, 1946 |
| 2,422,212 | Shann | June 17, 1947 |
| 2,568,906 | Williams | Sept. 25, 1951 |
| 2,652,197 | Berger | Sept. 15, 1953 |
| 2,811,202 | Schild et al. | Oct. 29, 1957 |